May 26, 1931. H. A. FINKE 1,807,087
INTERNAL COMBUSTION ENGINE
Filed Jan. 12, 1928 10 Sheets-Sheet 2

Fig. 2.

Inventor
Herman A. Finke
By
Attorney

May 26, 1931. H. A. FINKE 1,807,087
INTERNAL COMBUSTION ENGINE
Filed Jan. 12, 1928 10 Sheets-Sheet 4

Fig.4.

Inventor
Herman A. Finke
By
Attorney

May 26, 1931. H. A. FINKE 1,807,087
INTERNAL COMBUSTION ENGINE
Filed Jan. 12, 1928 10 Sheets-Sheet 5

Fig. 5.

Inventor
Herman A. Finke
By
Attorney

Patented May 26, 1931

1,807,087

UNITED STATES PATENT OFFICE

HERMAN A. FINKE, OF ST. LOUIS, MISSOURI

INTERNAL COMBUSTION ENGINE

Application filed January 12, 1928. Serial No. 246,213.

This invention relates to internal combustion engines and more particularly to engines of the rotary type, and has for its object to provide a construction which will be simple in cost and more efficient in use than those heretofore proposed.

With these and other objects in view the invention consists in the novel details of construction and arrangements of parts as will be more fully disclosed hereinafter and particularly pointed out in the claims.

Referring to the accompanying drawings forming a part of this specification in which like numerals designate like parts in all the views.

Briefly this invention covers an internal combustion engine of the rotary type, consisting of a plurality of cylinders (four being shown in the drawings) suspended in frames and attached to a valve housing casting to which the valves, spark-plugs, valve pistons, lubricating agitators, and lubricating pumps are attached. Also to the said frames are attached wheel pinions, each adapted to be driven by a piston pitman, said wheels being in mesh with a ring gear rigidly carried by the stationary housing of the engine. Suitable cams are provided upon a semi-stationary reversing plate mounting at the opposite end of the casing for actuating the valves and their stems and also carried by said mounting are the means for creating the electrical contact for firing the charge of combustible fluid used to drive the engine. The exhaust gases from the cylinders are collected in an annular chamber adapted to register with suitable exhaust ports in said engine housing. The means for lubricating the moving parts of the engine is controlled and actuated by the reciprocations of the valve stems, and the lubricant used further aids in cooling the valve parts.

Figure 1:
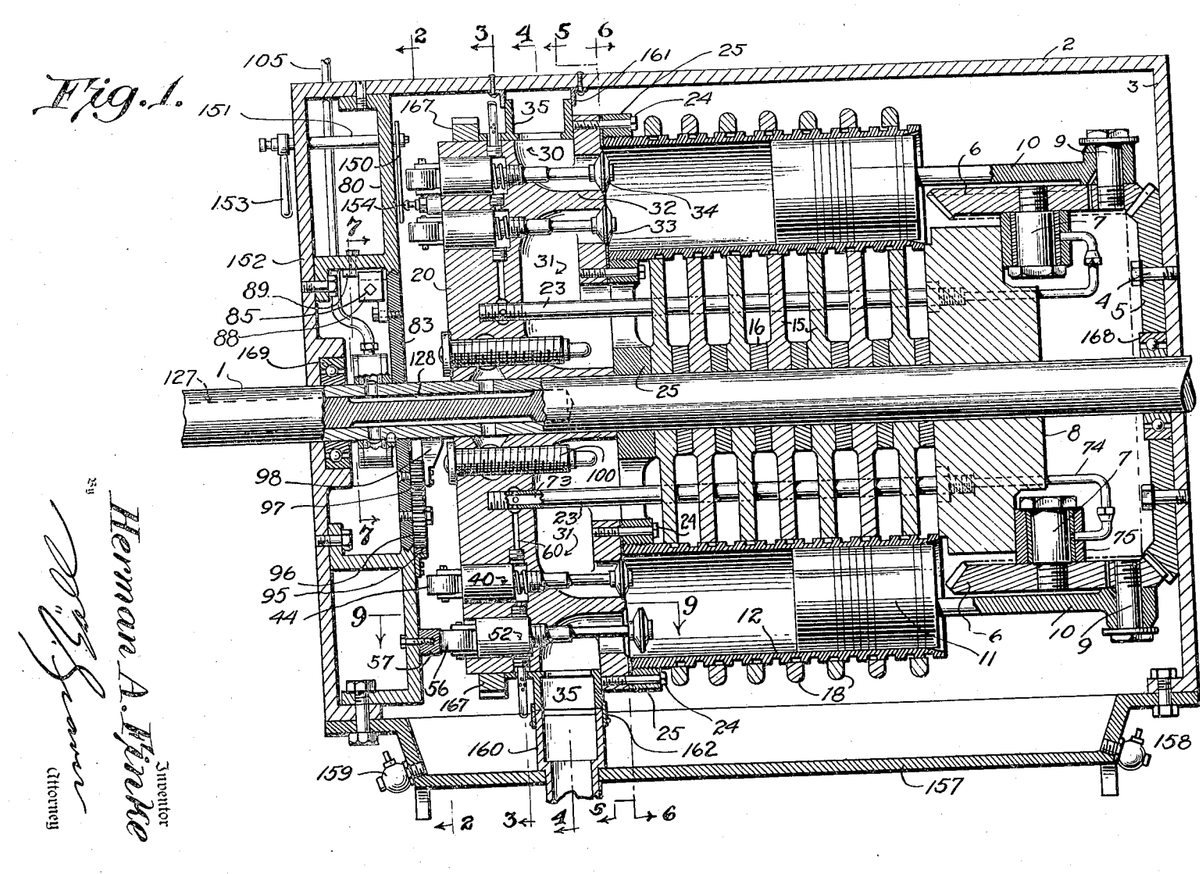
Fig. 1 is a vertical sectional view taken through the main shaft of the engine.

Referring more particularly to Fig. 1 the main shaft of the engine is represented by the numeral 1 and the engine housing by 2. Secured to one end plate 3 of said housing as by the bolts 4 and concentrically disposed with respect to said main shaft is a bevelled ring gear 5 meshing with bevelled gear pinions 6 each mounted on a stub 7 carried by a casting 8 rigidly disposed on the shaft 1. To each gear pinion 6 (of which there are as many as there are cylinders to the engine) is secured an outwardly extending crank pin 9 adapted to receive one end of a pitman 10 the other end of which is mounted on the usual wrist-pin carried by the piston 11 operating in a cylinder 12. Thus it will be seen that as the piston reciprocates in the cylinder, the pitman associated therewith will drive its gear pinion which is in mesh with the ring gear 5, and since the ring gear is rigidly secured to the engine housing and therefor stationary, the gear pinion will be caused to "walk" around said ring gear, thus imparting a rotary motion to the frame and cylinders of the engine with respect to the axis of the main shaft 1.

Figure 6:
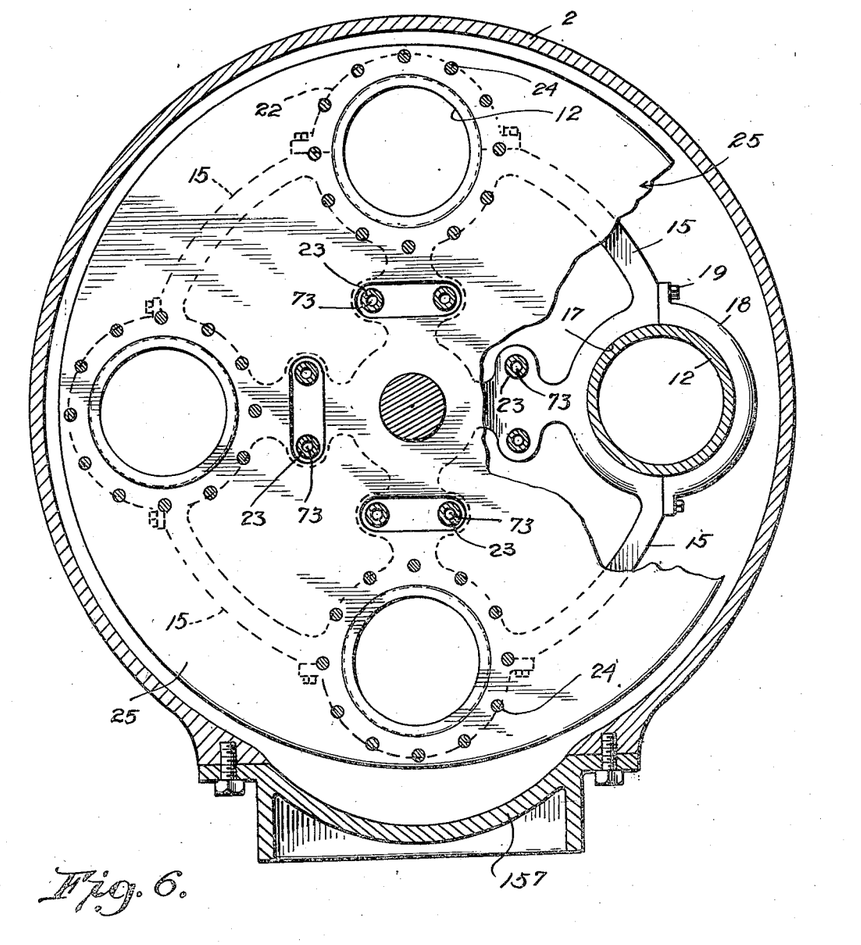
Fig. 6 is a transverse sectional view taken as on the line 6—6 of Fig. 1 and looking in the direction of the arrows.
Figures 7, 8, 9:
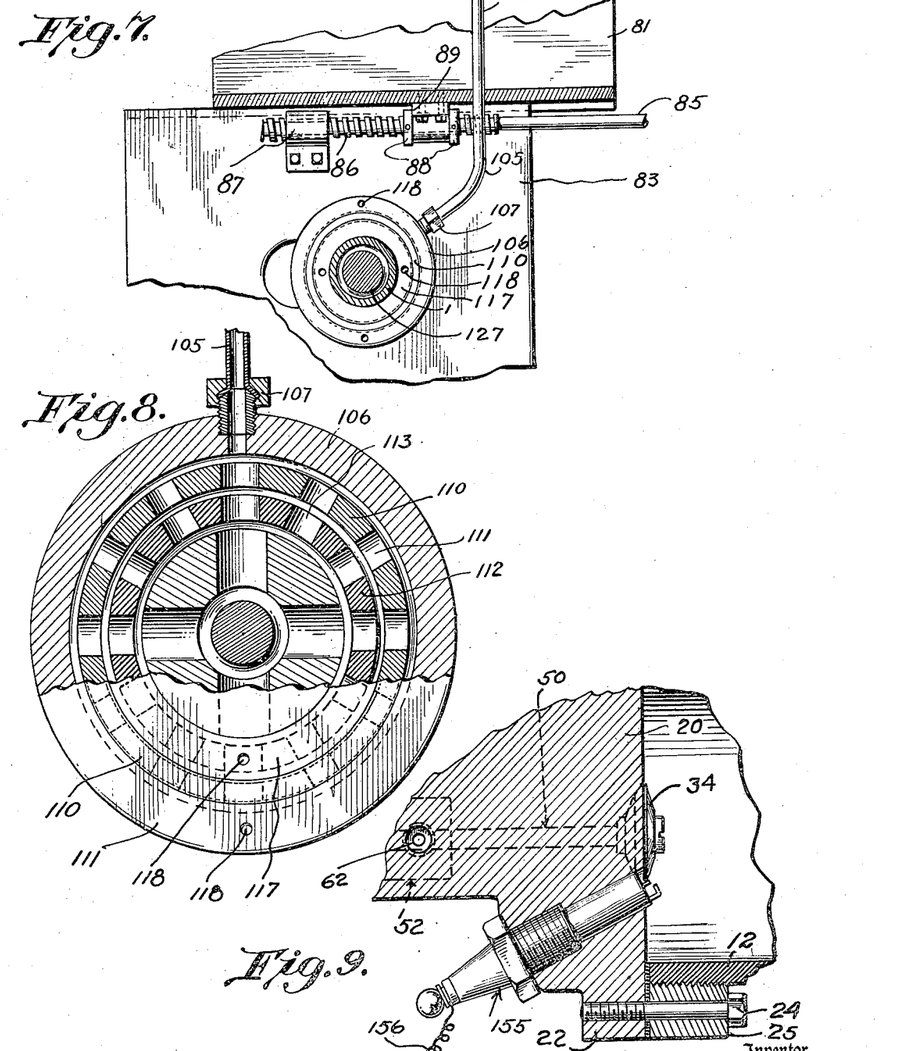
Fig. 7 is a transverse sectional view in detail as on the line 7—7 of Fig. 1 and looking in the direction of the arrows.
Fig. 8 is an enlarged transverse sectional view illustrating the means employed for admitting the combustible fluid to the engine, taken as on the line 8—8 of Fig. 10 and looking in the direction of the arrows.
Fig. 9 is a detail sectional view taken as on the line 9—9 of Fig. 1 and looking in the direction of the arrows.

The cylinders 12 are mounted in a plurality of parallelly disposed frames or bails generally indicated in Fig. 6 by the numeral 15 which are rigidly mounted on the main shaft 1 with suitable spacers 16 between each adjacent pair of frames, see Fig. 1. The periphery of each frame 15 is formed with a semi-circular recess 17 for each cylinder, and cooperating with said recess is a cap-piece 18 of semi-circular formation fitting over the other half of the cylinder, said cap-piece secured to its companion frame 15 in any suitable manner as by the bolts 19 all as will be readily understood from Fig. 6. Thus it will be seen that a plurality of cylinders can be supported by the plurality of frames 15 in any particular angular relation and in conformity with the type of engine desired. In the particular engine illustrated in the drawings, there are shown four cylinders spaced 90° apart but it is evident that a greater or less number may be employed with appropriate angular spacing therebetween.

Figure 3:
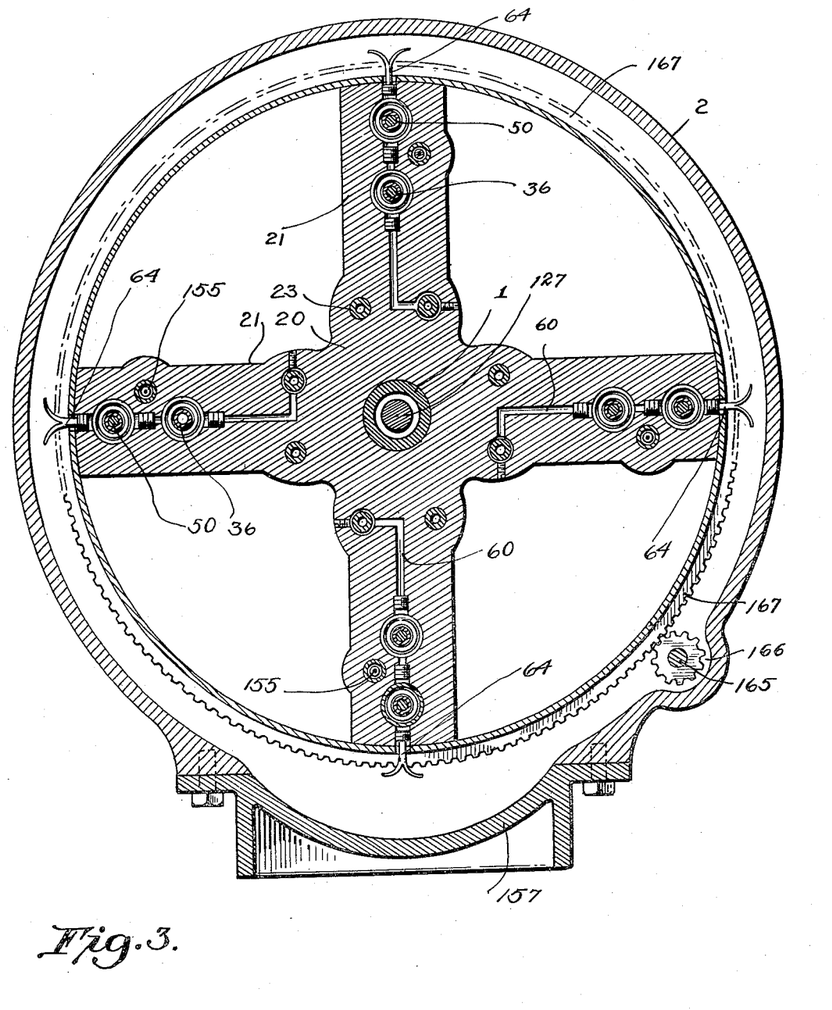
Fig. 3 is a transverse sectional view taken as on the line 3—3 of Fig. 1 and looking in the direction of the arrows.
Figure 5:
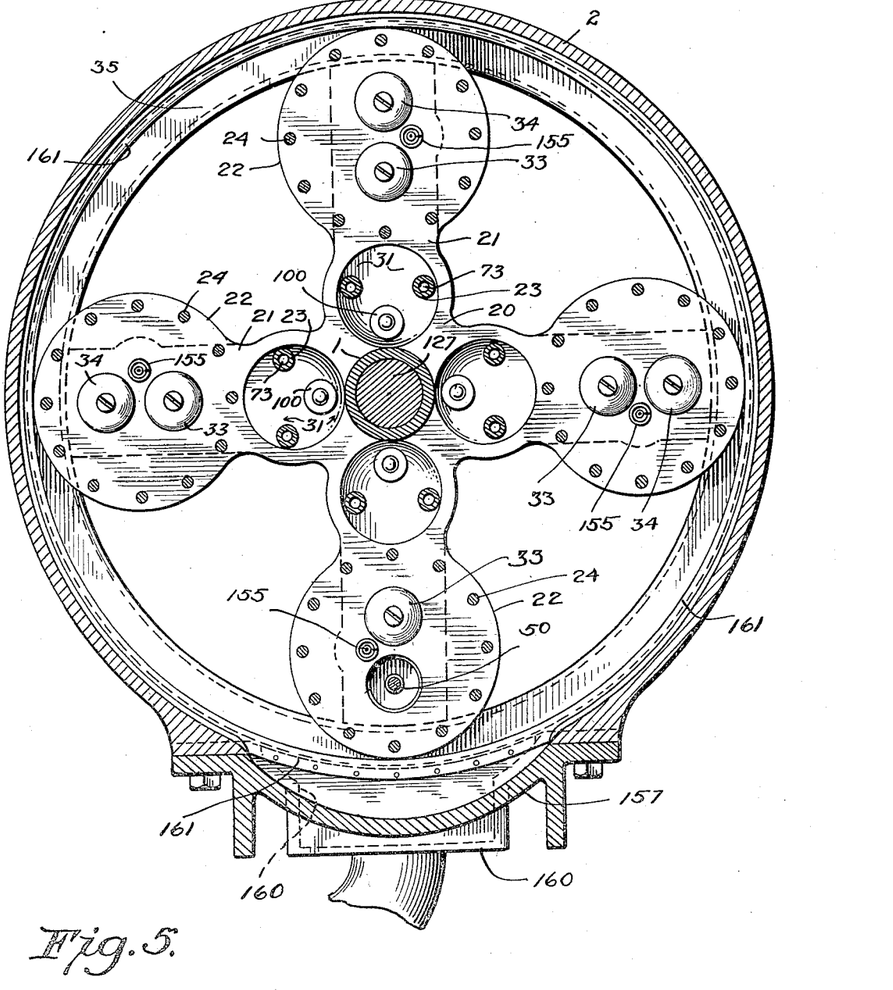
Fig. 5 is a transverse sectional view taken as on the line 5—5 of Fig. 1 and looking in the direction of the arrows.

Rigidly disposed on the main shaft 1 is a heavy casting 20, see Fig. 1 which serves not only as a cylinder head and the intake manifold for the engine but also serves as a valve housing. That is to say, this plate or casting 20 is cruciform in shape or in other words, comprises a main central portion with radial extensions or arms 21, one for each cylinder, and the end of each extension is circular as indicated at 22 to provide a cap or head for each cylinder, see Figs. 3 and 5. The casting 20 besides being mounted on the shaft 1 for rotation therewith is secured by a plurality of tie rods 23 of sufficient length to pass through the plurality of frames or bails 15, to the casting 8 which carries the gear pinions 6. Any suitable means of securement may be utilized, such for example as threading one end of the tie rods into the cylinder head 20 and applying a nut to the other end of each tie rod to draw the members 8, 15, 16 and 20 into tight immovable unity. Secured to said cylinder head as by the bolts 24 is a heavy template collar 25, any suitable packing being provided between said head and collar for making this joint leak proof.

Figure 4:
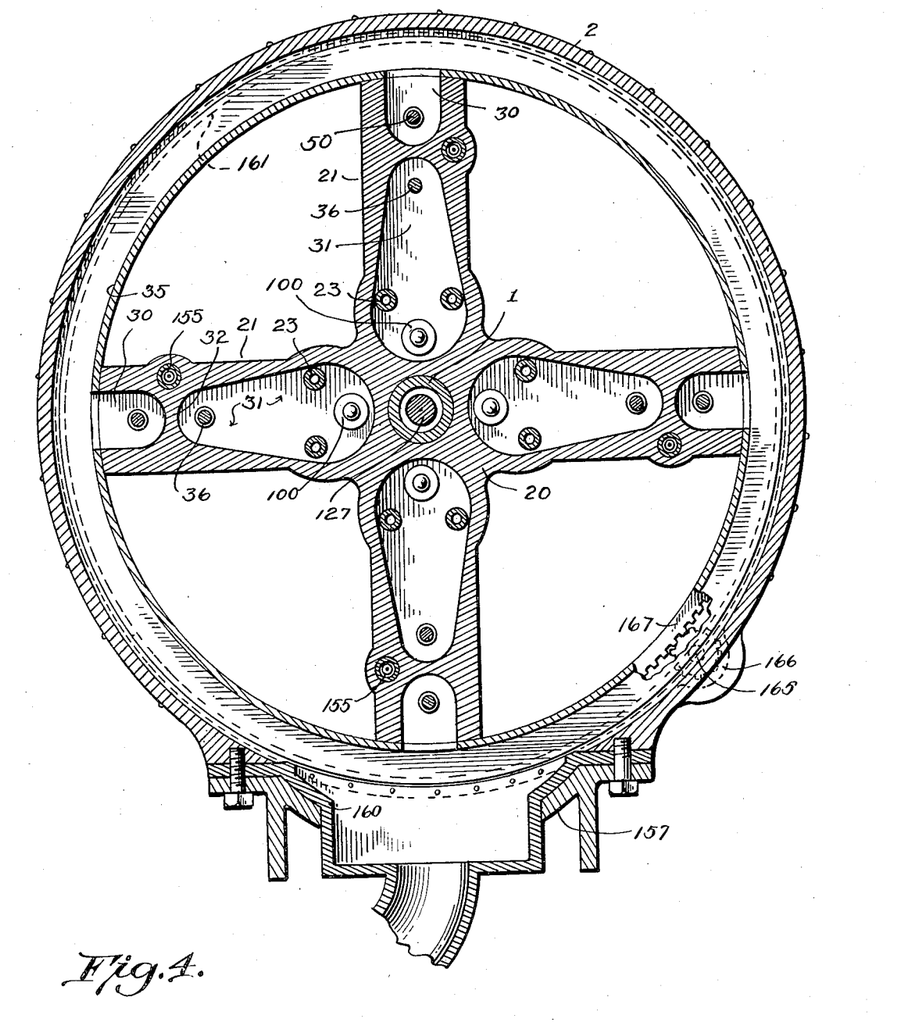
Fig. 4 is a transverse sectional view taken as on the line 4—4 of Fig. 1 and looking in the direction of the arrows.
Figure 12:
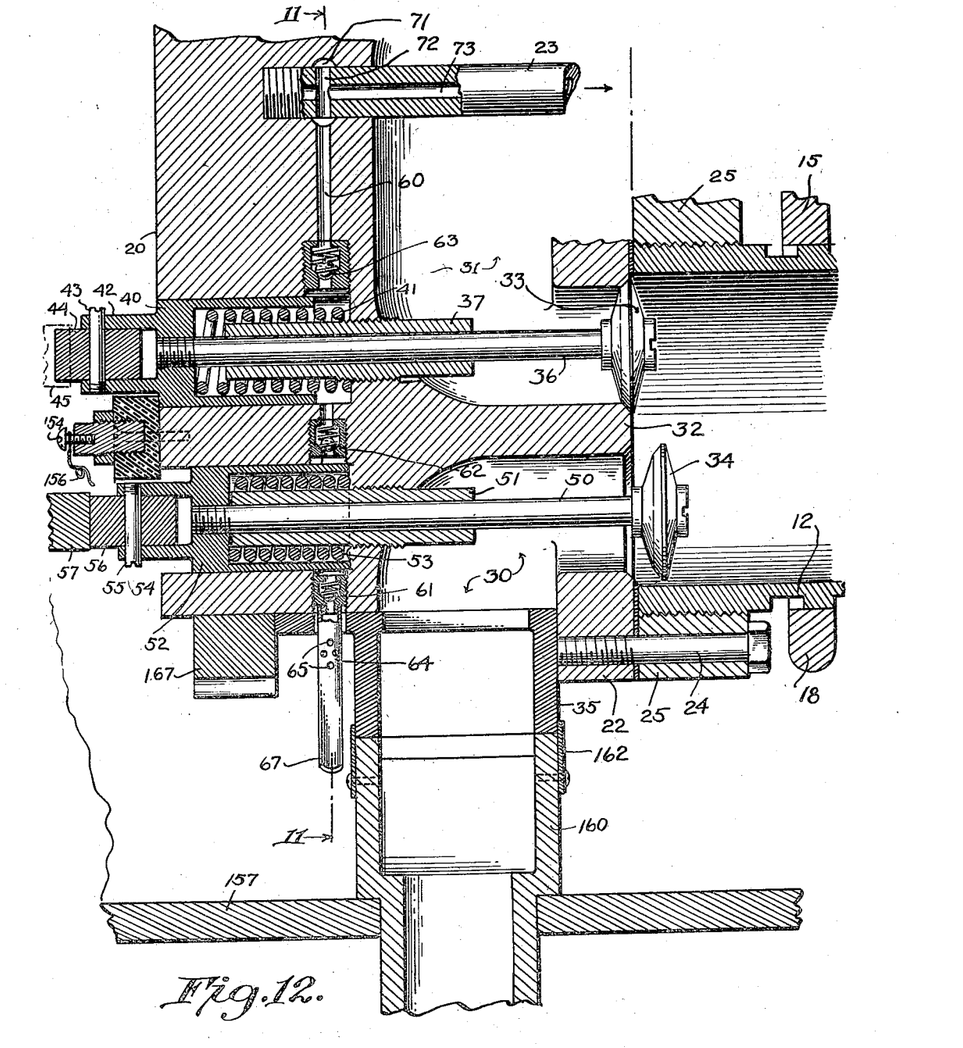
Fig. 12 is a vertical sectional view taken longitudinally of the engine showing the means for supplying oil for lubricating the engine, and the valve arrangement for one of the cylinders.

The construction of each extension 21 of the valve housing casting 20 is clearly shown in Figs. 4 and 12. In other words, said casting is cored to provide the exhaust chamber 30 at the extreme end portion of each extension 21 which is separated from the intake chamber 31 as by the wall 32. The inner surface of the exhaust and inlet chambers is curved as shown in Fig. 12 to more readily direct the intake and exhaust gases to and from each cylinder so that there may be a substantially unobstructed flow of these gases. The location of the wall 32, which partakes of the nature of a superheater for the incoming fuel, is axial with respect to each cylinder, and on either side of said wall is disposed a valve. The construction will be readily understood with particular reference to the figures of the drawings wherein it will be seen that the valve 33 controls the inlet of fresh fuel for combustion, and the valve 34 controls the exhaust of the burned gases from the cylinder, said exhaust gases passing from the chamber 30 into the annularly formed exhaust manifold 35 which is of substantially U-shaped formation and adapted to rotate with the cylinder head 20.

Each valve is provided with a stem, see Fig. 12, the extreme end of which is screw threaded into a valve piston. In other words, the inlet valve 33 has a stem 36 (having sliding engagement with the valve guide 37 carried by the cylinder head 20) which extends beyond its guide, the end being screw threaded into the cylindrical piston 40. To insure the seating of the valve 33 there is disposed a coil spring 41 between the valve guide 37 and the inner cylindrical wall of the piston 40. The head or closed end of the piston 40 is provided with a yoke 42 carrying a pin 43 on which is rotatably mounted a roller 44 adapted to contact with a cam track such as 45 during the travel of said roller about the shaft 1. In like manner the valve 34 is provided with a stem 50 passing through a valve guide 51 carried by the cylinder head 20, said stem having secured to its end a piston 52 between which and the guide 51 is disposed a coil spring 53. The end of the piston 52 is likewise provided with a yoke 54 carrying a pin 55 on which is rotatably mounted a roller 56 adapted to contact with a cam track such as 57 as said roller is carried around during the rotation of the engine.

Figure 11:
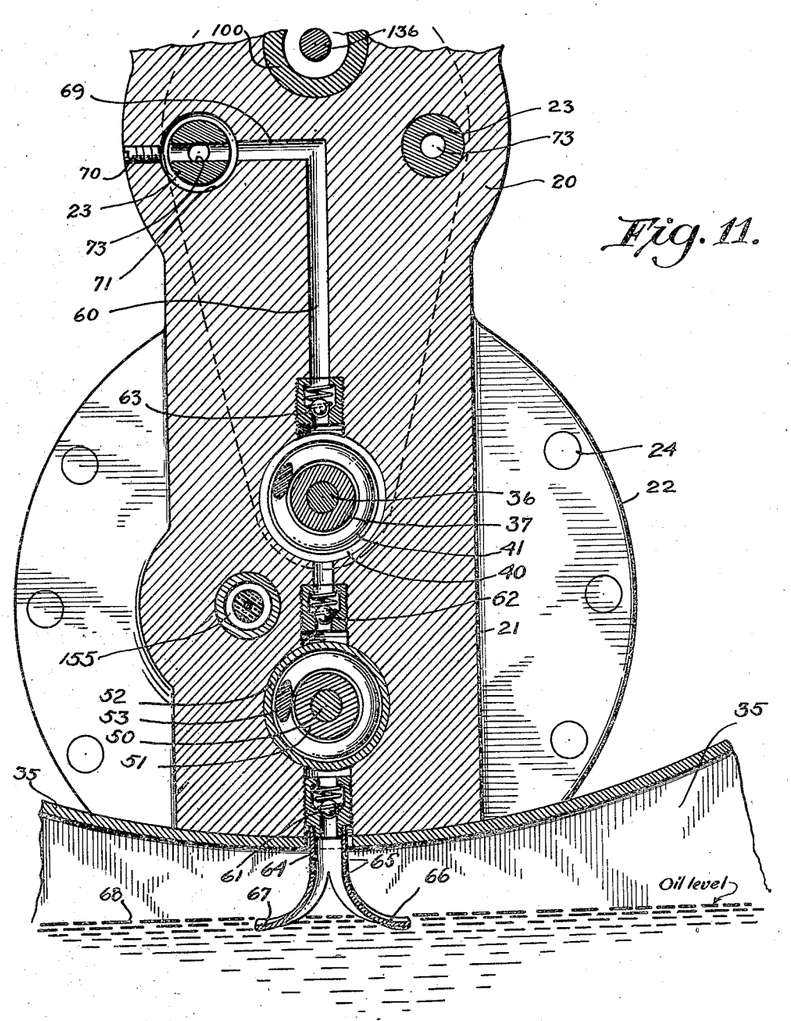
Fig. 11 is a vertical transverse sectional view of the oil feeding means taken as on the line 11—11 of Fig. 12 and looking in the direction of the arrows.

Each arm 21 of the cylinder head 20, as best shown in Fig. 1, 3, 11 and 12, is provided with a bore constituting an oil conduit 60 for each cylinder, said conduit extending to the outer end of each arm and provided with a plurality of enlarged portions to receive ball valves for controlling the flow of oil in said conduit. In other words, there is provided a ball valve 61 disposed on the outer side of the exhaust valve, a ball valve 62 disposed between the intake and exhaust valves, and a third ball valve 63 disposed between the intake valve and the tie rods associated with the cylinder head 20. Each ball is spring pressed as shown, the springs being so disposed as to permit passages of lubricating oil in a direction toward the main shaft 1 of the engine only. The extreme outer end of the conduit 60 is provided with any suitable device to scoop a quantity of oil from the sump and to direct the same to said conduit. In Figure 11 is shown one form of such a device, the same consisting of a tube 64 provided with a plurality of small apertures 65, said tube being diametrically split beyond said apertures to form two portions of the tube each of which is outwardly curved and bent to form the scoops 66 and 67 which, as the engine rotates, dip a slight distance below the sump oil level indicated at 68.

The method of lubricating the engine consists in scooping a small quantity of oil by either the member 66 or 67, according to the direction of rotation of the engine, and this oil will be forced toward and through the small apertures 65 to the interior of the tube 64. This action is augmented by the reciprocations of the exhaust and intake valves with their associated pistons 52 and 40 respectively. In other words, and with more particular reference to Fig. 12 it will be seen that during the rotation of the engine about the main shaft 1, the valve roller 56 will ride off its associated cam track 57 whereupon the spring 53 will force the exhaust valve 34 to its seat. In this movement, however, the piston 52 carried by the valve stem 50 will have moved to the left as seen in said figure and created a suction in the space within said piston. This suction is sufficient to draw oil past the ball valve 61 and into the piston chamber. When the exhaust valve is forced to open position by its roller 56 again contacting the cam track 57, then the piston 52 is moved toward the right as seen in said figure and this movement will force oil within the piston chamber past the intermediate ball valve 62 and into the chamber of the piston 40 of the intake valve 33. If said chamber is already filled with oil, some oil will be forced past the innermost ball valve 63 into the conduit 60. This pumping of the oil is thus seen to be alternately accentuated by the movements of the valve pistons 52 and 40 so that said oil is circulated through the cylinder head 20, cooling the same as well as the valve stems and guides therefor.

The innermost end of the conduit 60 terminates in substantially the line of the tie rods 23 holding the cylinders and adjacent portions of the engine together, and said terminus connects with the bore of one of said tie rods by a cross-passageway 69 drilled in the cylinder head 20. A screw plug 70 is provided in the outer extremity of said passageway to prevent the escape of oil therethrough. One of the recesses in the cylinder head 20 to receive a tie rod 23 is slightly enlarged as at 71 to insure registry of a diametric bore 72 adjacent the end of said tie rod, and this diametric passage is in open communication with a central bore 73 in said tie rod. In other words, each tie rod 23 is provided with an axial bore 73 communicating with a transverse bore 72 near one end, said transverse bore of one tie rod associated with each cylinder adapted to be in direct communication with the lubricating conduit 60 in the cylinder head 20, so that oil pumped by the valve pistons will pass through said tie rod. The other end of the lubricant-conveying tie rod is connected as by the pipe conduit 74 to the parts requiring lubrication. In Fig. 1 said conduit 74 is shown leading to the bearing 75 for the bevelled gear pinion 6 and it will be readily understood that oil delivered to said bearing will seep therefrom and properly lubricate not only the pinion 7, but the gears 6 and 5 as well as the pins 9 associated with the pitman 10 of each of the engine cylinders.

Figure 2:
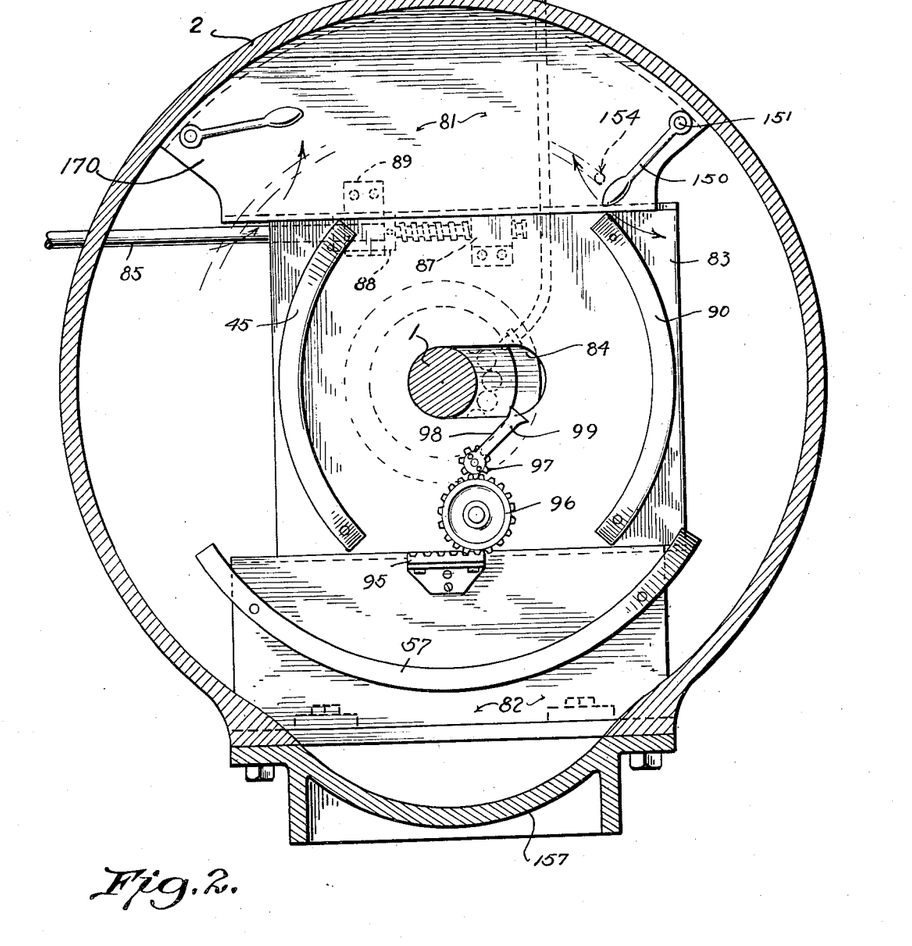
Fig. 2 is a transverse sectional view taken as on the line 2—2 of Fig. 1 and looking in the direction of the arrows.

Near one end of the casing 2 and rigid therewith is a vertical wall generally indicated by the numeral 80 adapted to carry the cam tracks for controlling the movements of the cylinder valves. This wall is shown in Fig. 2 as comprising a stationary upper portion 81, a stationary lower portion 82, and a central movable portion comprising the slide 83 provided with a central elongated slot 84 through which passes the main shaft 1. In other words, the lower edge of the portion 81 and the upper edge of the portion 82 are grooved to slidingly receive the bevelled top and bottom edges of the slide 83. In Fig. 2 the slide is shown in its extreme right hand position at which time the arcuate cam track 45 is disposed a radial distance from the main shaft 1 equal to the distance of the center of the intake valve from said shaft, thus resulting in the roller 44, mounted on said valve, coming in contact with and riding over the surface of the track 45 when the engine is rotating. The other arcuate cam track 90 carried by the slide 83 is adapted to engage with the roller 44 of the intake valve only when the slide 83 assumes its full left hand position with respect to the main shaft 1 as seen in Fig. 2. In other words, when the engine is rotating in one direction the cam track 45 will operate each intake valve 33 but when it is desired to rotate the engine in an opposite direction the slide 83 will be shifted whereupon the cam surface 45 will be moved out of the path of each intake valve roller 44 and the other cam track 90 moved into said path. There is provided an arcuate cam track 57 rigidly mounted on the lower stationary member 82 which always maintains the same position, functioning to operate each exhaust valve 34 of the engine.

When it is desired to change the direction of rotation of the engine, the slide 83 is shifted to its opposite position. This movement is accomplished in any suitable manner such as by a shaft 85 having on one end thereof a worm 86 adapted to operate through a companion threaded member 87 rigidly carried by the slide 83, axial movement of the shaft 85 being prevented by collars 88 working against the sides of a guide bracket 89 carried by the upper wall member 81. The shaft 85 may be rotated in any manner either manually or otherwise.

The means for controlling the amount of fuel admitted to the intake manifold of the engine is also mounted upon the wall 80. With particular reference to Figs. 1 and 2 it will be seen that this means comprises a rack 95 rigidly mounted on the lower plate portion 82 in substantial horizontal alignment with the grooved joint between said plate 82 and the slide 83. Meshing with this rack and rotatably supported by the slide 83 is the gear 96 adapted to enmesh with and rotate the small gear pinion 97 also mounted on said slide and having secured to the outer face thereof an extending arm 98 provided with a cam surface 99 adapted to actuate suitable mechanism to force a quantity of fuel from the carburetor chamber 100 into the intake manifold 31, there being one chamber 100 for each cylinder of the engine, all disposed the same radial distance from the center of the main shaft for actuation by the one cam arm 98. The purpose of mounting the cam arm 98 as above described is that it is always desired to admit the fuel at a definite time with relation to the actuation of the intake valve, and therefor the position of said cam arm in Fig. 2 is illustrated correctly for the timing of the opening of each intake valve 33 during rotation of the engine in a certain direction. However, when the engine is reversed the slide 83 moves to the left as seen in Fig. 2 and in this movement the gear 96, in moving with said slide, will be rotated due to its contact with the rack 95, and the rotation of said gear 96 will in turn rotate the small pinion 97 thus causing the cam arm 98 to swing in an arc in a clock-wise direction to assume a similar position on the other side of the center line between the gears 96 and 97.

The means for feeding the fuel through the intake manifold is shown in Figs. 1, 7, 8 and 10. The fuel is conducted from a suitable source as through the conduit 105 through the casing of the engine to an annular stationary receiving ring 106 disposed about the main shaft 1, a suitable gasketed joint generally indicated at 107 being provided to prevent leakage of fuel between said conduit and said ring. The ring 106 is separated from but maintained concentric with the main shaft 1 by means of a T-shaped collar comprising a portion 108 keyed as at 109 to the shaft 1 in a plane transverse to said shaft. Extending laterally from the portion 108 is an annular web portion 110 provided with a plurality of spaced radial apertures 111. The web 110 is adapted to support the fuel-receiving ring 106, and between said web and the main shaft 1 there is disposed a fuel distributor ring 112 which is likewise provided with a plurality of spaced radial apertures 113 adapted to register at times with the apertures 111 of the separating web 110. The distributor ring 112 has on either side thereof suitable packings 114 and 115, the former producing a leak-proof joint between the distributor ring, the T-shaped collar and the main shaft 1, and the other packing 115 provided for preventing leakage of the fuel on the other side of the distributor ring, all as will be evident from Fig. 10. In order to keep the fuel-receiving ring 106 and the distributor ring 112 in place, the extremity of the web 110 is threaded externally as well as internally in order to respectively receive the ring nuts 116 and 117, both of said nuts being provided with suitable means for application, such as apertures indicated by the numeral 118 to receive a spanner wrench.

Figure 10:
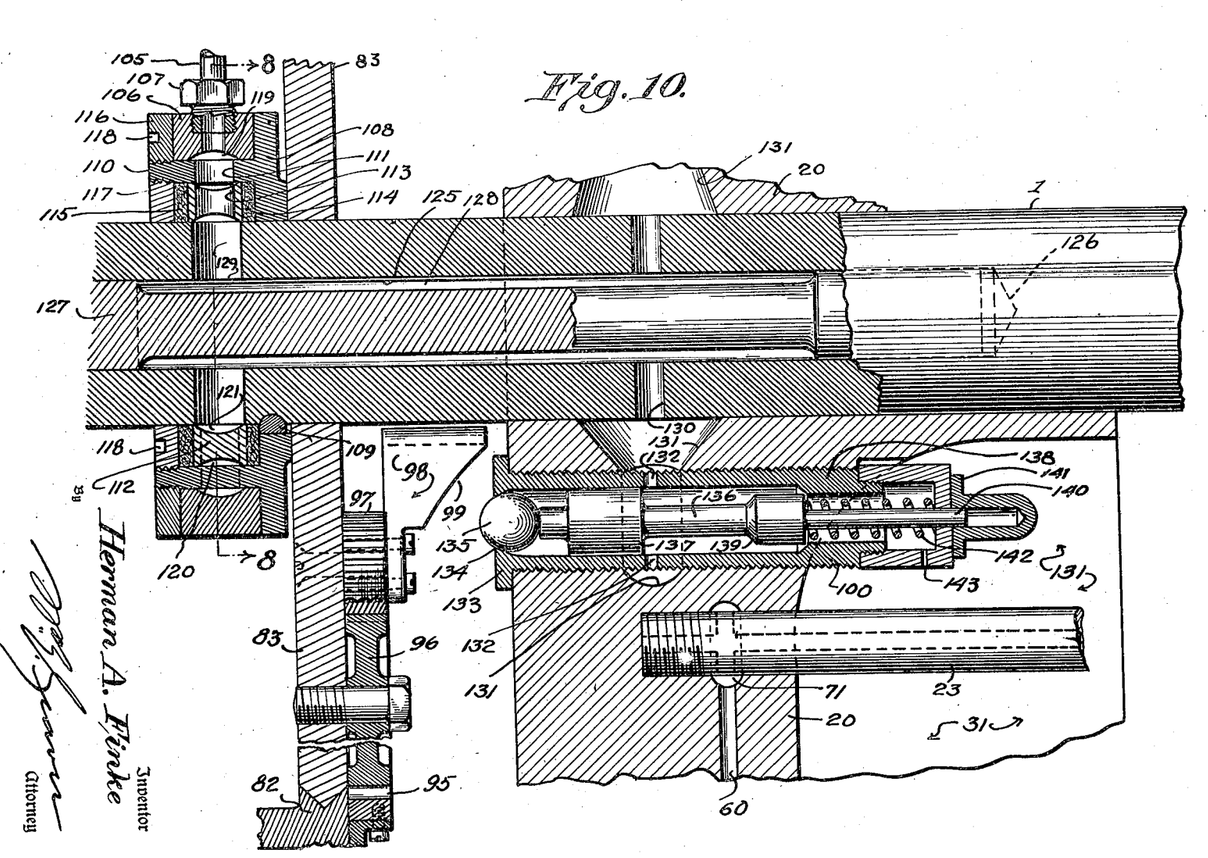
Fig. 10 is an enlarged partial sectional view taken longitudinally of the main engine shaft and illustrating the feed of the combustible fluid to the engine.

The inner or concave surface of the receiving ring 105 is grooved as indicated at 119, and both outer and inner surfaces of the distributor ring 112 are grooved as indicated at 120 and 121 to create fluid chambers. In other words, the liquid fuel coming through conduit 105 will pass through the receiving ring 106 and flow into the chamber 119 and from this chamber it will pass through the plurality of radial apertures 111 in the web 110 to reach the chamber 120, and from this chamber it will pass through the plurality of radial apertures 111 in the web 110 to reach the chamber 120, and from this chamber it will pass through the plurality of radial passages 113 in the distributor ring 112 and gain this chamber 121. The purpose of providing this particular construction is to insure a more even feed of the fluid than would be the case were the grooved chambers 119, 120 and 121 provided. In other words, due to the fact that the distributor ring 112 may or may not rotate with the shaft 1 (depending upon the degree of friction between said ring and the packing elements 114 and 115) and further due to the fact that the web 110 is a part of the T-shaped collar 108 which is keyed to the main shaft 1 and therefor rotates therewith, there would ordinarily be a shearing-off of the fluid in the openings 111 and 113 from the fluid in the receiving ring 106 and in the main shaft 1, so that an insufficient quantity of fuel would reach the carbureting device. On the other hand, by providing the grooved chambers above described there is a more definite continuity of fluid throughout the entire structure which thus permits a more even flow of said fluid as required.

The end of the main shaft 1 adjacent the cylinder head 20 is centrally bored as at 125, said bore, however, terminating at about the point 126. Within the bore is fitted a plug 127 the diameter of which is reduced throughout a portion of its length as clearly indicated in Fig. 10 to provide the annular chamber 128 through which the fuel may pass to the carburetting device. In other words, the fuel from the distributor ring 112 and its associated grooved chamber 121 will pass through a plurality of radial apertures 129 in the outer portion of the main shaft 1 and gain the annular chamber 128 through which the fluid may pass, reaching a second set of radial apertures 130 of which there is one for each cylinder of the engine. With particular reference to Fig. 10 it will thus be seen that the fluid upon passing through the apertures 130 in the main shaft will enter a V-shaped groove having sides 131 in the cylinder head 20, said V-shaped groove being annular in extent and extended around each carburetor as indicated. This groove 131 communicates with the carburetor chamber above mentioned through two or more ports such as 132 in the cylindrical wall thereof to more efficiently supply said carburetor with fuel.

The carburetor may be of any suitable construction but that shown in Fig. 10 has been found efficient. This carburetor comprises the chamber portion 100 which is screw-threaded through the cylinder head 20 and provided at one end with a head 133 having a central circular opening 134 to receive and seat a ball 135, serving as a means for actuating the piston within the chamber 100. Said piston comprises a main central portion 136 having an enlarged head 137 slidingly operating over the inner surface of the chamber 100, the ball 135 being adapted to contact with said head. The chamber 100 has a somewhat reduced end portion 138 the inner surface of which is adapted to slidingly and contactingly receive an enlarged portion 139 on the piston stem 136. In fact this enlarged portion constitutes the piston for forcing the liquid fuel from the chamber 100 into the intake manifold 31 associated with each cylinder. The piston 139 has a central extension which may be termed the guide stem, indicated at 140, adapted to reciprocate in a suitable end housing 141 screwed to the carburetor chamber 100. A coil spring 142 is disposed about the guide stem 140 and interposed between the end wall of the housing 141 and the piston 139 to force the latter toward the left as seen in Fig. 10 at which time the ball 135 will be moved toward and positioned in the circular opening 134 in the head of the chamber 100, so that a portion of said ball will extend beyond said chamber head, and the chamber is so positioned within the cylinder head 20 that said ball will, while rotating about the main shaft 1, come in contact with the cam 98 carried by the slide 83.

Thus it will be seen that the ball 135 forms contact with and is depressed in its passage over the inclined surface 99 of said cam, the said ball thereby receiving a quick thrust which will in turn reciprocate the piston 139 to force fluid out of the chamber 100 through a minute port 143 into the intake manifold 31. The head 137 above described serves as a guide for the piston at one end and the housing 141 serves, together with the extension 140, as a guide for the other end of said piston, and the head 137 is so positioned that as the piston 139 moves to the right as seen in Fig. 10 to force the fluid out of the chamber 100, said head 137 will pass the aperture 132 to cut off the flow of fluid from the distributor ring to the carburetor chamber 100.

Thus it will be seen that only a limited quantity of fluid can be forced from the chamber 100 and that while this fluid is being so forced no additional fluid may enter the chamber. However, when the piston 139 is moving to the left under the action of the spring 142, the guide head 137 will uncover the aperture 132 to admit more fluid to the chamber, and will at the same time conduct the ball 135 to its seat in the head 133 where it may again strike the cam 98. It is needless to say of course that there is a carburetor chamber 100, with associated parts as just described, for each cylinder, and the port 143 is of such small dimensions that the liquid fluid will be atomized upon passing therethrough into the intake manifold. Further, it will be seen that the relative close proximity of each carburetor 100 to the walls 32 separating the intake and exhaust valves makes possible an increase in the element of certainty of operation over heretofor known constructions. That is to say, the terrific heat generated in the combustion chamber is transmitted to said wall 32 causing it to serve by radiation as a superheater to the charge in the intake manifold, and said heat has its effect upon the fuel in the carburetor chamber by raising the temperature thereof. Also, each carburetor being contained within the engine metal walls, and discharging substantially at the point of cylinder intake, prevents the usual chilling of the fuel by passing air.

The upper stationary plate 81 above described carries an electrical contact member 150 mounted on the end of a shaft 151 supported in said plate and having its other end supported in the end wall 152 of the casing 2 surrounding the engine, any suitable device such as the lever 153 being provided on said shaft for turning the same to change the position of the electrical contact member 150. The member 150 is so positioned that as the engine revolves, a companion electrical contact member 154 will strike the same and close the electric circuit to a spark plug indicated in Fig. 9 by the numeral 155. That is to say, current from a suitable source, not shown, but well understood, will pass to the electric contact member 150 which is suitably insulated from the engine and its mounting. As the engine rotates the other electric contact member 154 (of which there are as many as there are cylinders and each of which is insulatedly mounted on the cylinder head casting 20) will make momentary contact with said member 150, whereupon the current will be passed through the member 154 to, and over, a wire 156 to the central member of the spark-plug 155. The current will be of sufficient voltage to jump the usual spark gap of the plug 155 and the current will return to its source by virtue of a common ground connecting said source and said spark plug as well understood. The advancement or retardation of the time of the spark with relation to the rotation of the engine may be varied by turning the shaft 151 carrying the electric contact member 150 as will be readily understood. Each spark plug 155 is set obliquely in the arm 21 of the cylinder head 20 so that the spark will be created at a point adjacent the axial center of the cylinder, see Figs. 3, 4 and 9. There is also provided a second contact finger, presently to be described, adapted to function only when the engine is reversed, said second finger being turned out of the path of the revolving contact member 154 when the same is cooperating with the finger 150.

At the bottom of the casing 2 surrounding the engine there is provided a sump 157 adapted to contain the lubricating oil, and provided with a casting 160 of trough-like shape and extending upwardly to meet the extending circumferential edges of the exhaust manifold 35, so that the exhaust gases may be delivered exteriorly of the engine casing. The annular exhaust chamber 35 is adapted to rotate with the engine between suitable seals carried by the casing, such for example as shown at 161 in Figs. 1 and 4, and leakage of the exhaust gases into the engine casing at the lower portion thereof is prevented by side plates 162 covering the joint between the exhaust chamber 35 and the sump casting 160.

The casing 2 is provided with a bearing for receiving the shaft 165 of a starting motor, not shown, said shaft having mounted thereon a pinion 166 meshing with a ring gear 167 mounted circumferentially of the cylinder head 20, and said casing is provided with suitable bearings such as indicated at 168 and 169 within which the main shaft 1 rotates.

Thus it will be seen that by this invention there is provided an engine having a plurality of cylinders, each cylinder having associated therewith a piston adapted to drive a bevelled pinion, and all of said pinions enmeshed with a common ring gear which is stationary with respect to the mounting of the engine so that, as the pistons reciprocate, their drive pinions will travel around said ring gear with resultant rotation of the cylinders as a unit around the main shaft of the engine which passes through said ring gear. Further it will be observed that each cylinder has associated therewith an intake and an exhaust valve as well as a spark plug all of which are carried by an oil-cooled unitary casting constituting the cylinder head and which is adapted to be rigidly mounted on the main shaft of the engine which is centrally disposed of said cylinder head.

It will further be evident from the drawings that since the cylinder head revolves with the main shaft, there may be mounted on said cylinder head various means for actuating the valves and firing the combustible fluid within the cylinders. In connection with said firing it should be stated that there is mounted on the plate 81 another electric contact finger member 170 exactly like the member 150, said member 170 being adapted for use when the rotation of the engine is reversed at which time the other contact member will, of course, be turned out of operating position. Also it will be observed that said cylinder head carries a plurality of carburetors, one associated with the intake manifold for each cylinder and that all of said carburetors are adapted to receive the combustible fluid through the main shaft of the engine.

It will also be seen that by this invention the engine can be readily started and that there are means provided for insuring the opening and closing of the valves at proper intervals to admit a heated charge of fresh combustible fluid and to allow the burned gases from each cylinder to fully escape from the engine. Also this invention contemplates a ready reversal of directional rotation of the engine by single means, the movement of which not only reverses the operation of the valves, but also controls the admission of fuel to the intake manifold for each cylinder. The cam tracks are planar, except at their ends where inclination is provided for smooth riding of the cam rollers 44 and 57 off and on said tracks, whereby the valves are left in full open position during a period of time ample to effect a perfect intake and exhaust.

In other words, due to the construction of the cam tracks and coacting rollers carried by the valves, an immediate opening and closing of said valves is permissible thus enabling the piston to draw in more air and fuel mixture with less exertion, and more quickly adding volumetric efficiency to the charge taken into the cylinders. By reason of this instant or immediate opening of the valves and the keeping of the same fully opened, the exhaust valve especially permits the piston to force out of the cylinder all of the waste gases more rapidly than in constructions heretofore known, and by this invention the friction on the valves and their stems is materially lessened, and the speed substantially increased at which this engine may be successfully operated over long periods of time.

A further advantage to be found in the construction according to this invention is the substantial elimination of warping or distortion of the cylinder due to the extreme heat therein. In other words, the space in a cylinder at the time of explosion is approximately one inch in axial length and the usual explosion creates a force of between a thousand and fifteen hundred pounds per square inch at that moment in present known types of engines. This pressure is substantially increased in the engine of this invention. Heretofore known engines have a relatively thin cast iron wall of about ⅜ inch thickness, webbed against the outside of the body of the engine and with only a water jacket between so that when these surfaces become heated in service, there is a warp or split produced. The engine of this invention contemplates developing a higher speed than heretofore known types, a speed more closely approximating the steam turbine. Therefor the explosion in the cylinders of this engine will be far more severe than in other engines known, and therefor it is an important feature to provide a cylinder head 20 and a template collar 25 of relative great strength. The collar 25 is made with a thickness equal to the axial dimension of the space in the cylinder at the instant of explosion so that the terrific heat in said cylinder will be transmitted to a larger volume of metal than heretofore. The natural result of this construction is that the force created in each cylinder can be exerted against said piston only in one direction, and that against the face of the piston with the result that power will be exerted to the full extent of the pressure per square inch.

By taking the exhaust gases from the engine through the sump containing the oil, the oil is heated quickly and any leakage fuel dropped into the sump, as usual at the time of starting the engine when cold, is vaporized by the heat of said exhaust gases and oil, and the vaporized fuel will pass up through the space within the engine casing, between the bails 15, and reenter the intake manifold, so that there is no loss of fuel. This permits a great economy as well as facilitates the starting of the motor when cold and, further, this heat, vaporizing the lighter volatiles in the oil, has the additional faculty of retaining the viscosity or lubricant qualities of the oil for a longer period of time than in heretofore known types of engines, and still further, enriches the mixture of air to be used in the process of carburetion. Still further advantages over prior constructions will be obvious, such as the recovery of fuel lost due to leaky piston rings, etc. In other words the intake manifolds 31 are in open communication with the spaces between the bails 15 and therefor open to the sump space. It thus results that any vapors within the engine housing 2 will be drawn through the intake manifold into the cylinders for consumption.

There is provided a precise method or system of ignition due to the elimination of usual timing gears which wear, rattle, vibrate and therefor alter the exact firing points according to the "age" of the engine. This means of ignition control secures simplicity of construction and insures efficient operation.

The vary nature of construction of this engine further insures efficiency in that, after operating over a long period of time with accompanying wear of parts, the engine will still run with substantial silence by reason of the fact that the centrifugal forces will hold the parts rigidly against their bearing surfaces, and oil vapors will be ever present to further aid in the lubrication of parts untouched through the force-feed system. The movement of the engine, being in way gyroscopical, will tend to increasingly reduce the vibrations thereof as the speed increases, contrary to the effect obtained similarly in prior known constructions.

The overheating of valves, so frequently occurring in high speed engines under continuous operation and caused by the comparatively small volume of metal in the valve itself around which and against the face of which a terrific heat is thrown during the periods of compression, combustion and exhaust, is surprisingly absent in this construction in view of the larger volume of metal tightly joined together. In other words the transmutation of heat to said joined additional metal has the well known tendency to prevent the overheating of the valves which, supplemented by the flow of oil through the lubricating channels of which the valve stems themselves are a part, affords a valve cooling process believed heretofor unused and therefor unknown.

Lastly it is to be observed that by this invention there is provided a means of lubricating all the parts associated with each cylinder, said means being operable by the actuation of the valves. In other words, each valve has a piston which operates to force the lubricating fluid to the desired parts of the engine, the conductivity of said lubricant being through important and necessary parts of the engine.

It is obvious that those skilled in the art may vary the details of construction as well as arrangements of parts without departing from the spirit of the invention, and it is therefor not desired to be limited to the above disclosure except as may be required by the claims.

What is claimed is:

1. In an internal combustion engine provided with a shaft the combination of a plurality of cylinders mounted for rotation with said shaft; a head for said cylinders; valves for each cylinder carried by said head; and stationary means to actuate all of said valves in predetermined and reversible sequence.

2. In an internal combustion engine provided with a shaft the combination of a plurality of cylinders mounted for rotation with said shaft; a head for said cylinders; valves for each cylinder carried by said head; stationary means to actuate all of said valves in predetermined sequence; and means to change said sequence.

3. In an internal combustion engine provided with a shaft the combination of a plurality of cylinders mounted for rotation with said shaft; a head for said cylinders; valves for each cylinder carried by said head; and stationary means including a readily adjustable cam to actuate all of said valves in predetermined sequence.

4. In an internal combustion engine provided with a shaft the combination of a plurality of cylinders mounted for rotation with said shaft; a head for said cylinders; valves for each cylinder carried by said head; stationary means including a pair of cams each of which is to actuate all of said valves in alternate and different predetermined sequence; and means to shift said cams into operative positions.

5. In an internal combustion engine provided with a shaft the combination of a plurality of cylinders joined to said shaft; a head for said cylinders; a fuel intake chamber in said head for each cylinder; and a carburetor for each cylinder providing means to deliver fuel to each of said chambers through said shaft.

6. In an internal combustion engine provided with a shaft the combination of a plurality of cylinders joined to said shaft; a head for said cylinders; a fuel intake chamber in said head for each cylinder; and means including a distributor ring interposed between said shaft and a source of supply to deliver fuel to each of said chambers through said shaft.

7. In an internal combustion engine provided with a shaft the combination of a plurality of cylinders joined to said shaft; a head for said cylinders; a fuel intake chamber in said head for each cylinder; and means controlled by a stationary member to deliver fuel to each of said chambers through said shaft.

8. In an internal combustion engine provided with a shaft the combination of a plurality of cylinders joined to said shaft; a head for said cylinders; a fuel intake chamber in said head for each cylinder; and a carburetor controlled by a stationary member providing means to deliver fuel to each of said chambers through said shaft regardless of directional rotation of said engine.

9. In an internal combustion engine of the rotary type provided with a shaft, a plurality of cylinders adapted to revolve bodily about the axis of said shaft and a cylinder head common to all of said cylinders and rotating therewith the combination of intake and exhaust valves carried by said head for each cylinder, each valve having a stem extending through said head said stem having a friction reducing cam-engaging end; a stationary plate mounted in close proximity to said head and carrying a cam adapted to actuate one set of said valves; and a second plate carrying a pair of cams each of which is adapted to actuate the remaining valves in accordance with the desired directional rotation of said engine.

10. In an internal combustion engine of the rotary type provided with a shaft, a plurality of cylinders adapted to revolve bodily about the axis of said shaft and a cylinder head common to all of said cylinders and rotating therewith the combination of intake and exhaust valves carried by said head for each cylinder, each valve having a stem extending through said head said stem having a friction reducing cam-engaging end; a stationary plate mounted in close proximity to said head and carrying a cam adapted to actuate one set of said valves, and a second plate movably mounted on said stationary plate, said second plate carrying a pair of cams each of which is adapted to actuate the remaining valves in accordance with the desired directional rotation of said engine.

11. In an internal combustion engine of the rotary type provided with a shaft, a plurality of cylinders adapted to revolve bodily about the axis of said shaft and a cylinder head common to all of said cylinders and rotating therewith the combination of intake and exhaust valves carried by said head for each cylinder, each valve having a stem extending through said head said stem having a friction reducing cam-engaging end; a stationary plate mounted in close proximity to said head and carrying a cam adapted to actuate one set of said valves; and a second plate lying in the same plane with said stationary plate, the former carrying a pair of cams each of which is adapted to actuate the remaining valves in accordance with the desired directional rotation of said engine.

12. In an internal combustion engine of the rotary type provided with a shaft, a plurality of cylinders adapted to revolve bodily about the axis of said shaft and a cylinder head common to all of said cylinders and rotating therewith the combination of intake and exhaust valves carried by said head for each cylinder, each valve having a stem extending through said head said stem having a friction reducing cam-engaging end; a stationary plate mounted in close proximity to said head and carrying a cam adapted to actuate one set of said valves; and a second plate normally stationary carrying a pair of cams said plate adapted to be moved from one position to another whereby each cam will actuate the remaining valves differently in accordance with said positions.

13. In an internal combustion engine of the rotary type provided with a shaft, a plurality of cylinders adapted to revolve bodily about the axis of said shaft and a cylinder head common to all of said cylinders and rotating therewith the combination of intake and exhaust valves carried by said head for each cylinder, each valve having a stem extending through said head said stem having a friction reducing cam-engaging end; a stationary plate mounted in close proximity to said head and carrying a cam adapted to actuate the exhaust valves; and a second plate mounted in slidable edge to edge relation with said stationary plate, said second plate carrying a pair of cams each of which is adapted to actuate alternately the intake valves in accordance with the desired directional rotation of said engine.

14. In an internal combustion engine provided with a shaft the combination of a plurality of cylinders mounted for rotation with said shaft; a head for said cylinders; intake and exhaust valves for each cylinder carried by said head; a carburetor for each cylinder carried by said head; means to control the actuation of each carburetor; a stationary plate provided with a cam adapted to actuate the exhaust valves; a second plate movably mounted on said stationary plate, said second plate provided with a pair of cams each of which is to actuate the intake valves; means to shift said second plate to bring its cams into operative positions; and means to govern the carburetor control means.

15. In an internal combustion engine provided with a shaft the combination of a plurality of cylinders mounted for rotation with said shaft; a head for said cylinders; intake and exhaust valves for each cylinder carried by said head; a carburetor for each cylinder carried by said head; means to control the actuation of each carburetor; a stationary plate provided with a cam adapted to actuate the exhaust valves; a second plate movably mounted on said stationary plate, said second plate provided with a pair of cams each of which is to actuate the intake valves; means to shift said second plate to bring its cams into operative positions; and means carried by both of said plates to govern the carburetor control means.

16. In an internal combustion engine provided with a shaft the combination of a plurality of cylinders mounted for rotation with said shaft; a head for said cylinders; intake and exhaust valves for each cylinder carried by said head; a carburetor for each cylinder carried by said head; means to control the actuation of each carburetor; a stationary plate provided with a cam adapted to actuate the exhaust valves; a second plate movably mounted on said stationary plate; said second plate provided with a pair of cams each of which is to actuate the intake valves; means to shift said second plate to bring its cams into operative positions; and geared means to govern the carburetor control means in accordance with the operative positions of said intake valve operating cams.

17. In an internal combustion engine means for carburizing the fuel independently for each cylinder; intake and exhaust valves for each cylinder; and means for variably operating said valves as well as controlling the carburizing means.

18. In an internal combustion engine separate means for carburizing the fuel for each cylinder; intake and exhaust valves for each cylinder; and readily adjustable means commonly coacting for operating said valves as well as controlling the carburizing means.

19. In an internal combustion engine, independent means for carburizing the fuel for each cylinder; intake and exhaust valves for each cylinder; and means including simultaneously shiftable cams for operating said valves as well as controlling the carburizing means.

20. In an internal combustion engine separate means for independently carburizing the fuel for each cylinder; intake and exhaust valves for each cylinder; and a shiftable plate carrying means for variably operating said valves as well as for changing the actuation of the carburizing means.

21. In an internal combustion engine, independent means for carburizing the fuel for each cylinder; intake and exhaust valves for each cylinder; and means for alternately and differently operating said valves as well as reversing the operation of said carburizing means.

22. In an internal combustion engine, independent means for carburizing the fuel for each cylinder; intake and exhaust valves for each cylinder; and means for alternately and differently operating said valves in predetermined sequence, said means including means for changing the actuation of the carburizing means in accordance with said valve operating sequence.

23. In an internal combustion engine provided with intake and exhaust valves for each cylinder, and a carburetor for each cylinder the combination of a pair of plates, one plate carrying means to actuate the exhaust valves, the other plate carrying means to actuate the intake valves as well as each carburetor; and means to shift one plate relative to the other to change the actuation of said intake valves and said carburetors.

24. In an internal combustion engine provided with intake and exhaust valves for each cylinder, and a carburetor for each cylinder the combination of a pair of plates mounted in the same plane, one plate carrying means to actuate the exhaust valves, the other plate carrying means to actuate the intake valves as well as each carburetor; and means to shift one plate relative to the other to change the actuation of said intake valves and said carburetors.

25. In an internal combustion engine provided with intake and exhaust valves for each cylinder, and a carburetor for each cylinder the combination of a pair of plates mounted edge to edge, one plate carrying means to actuate the exhaust valves, the other plate carrying means to actuate the intake valves as well as each carburetor; and means to shift one plate relative to the other to change the actuation of said intake valves and said carburetors.

26. In an internal combustion engine provided with intake and exhaust valves for each cylinder, and a carburetor for each cylinder the combination of a pair of plates mounted one upon the other, one plate carrying means to actuate the exhaust valves, the other plate carrying means to actuate the intake valves as well as each carburetor; and means to shift one plate relative to the other to change the actuation of said intake valves and said carburetors.

27. In an internal combustion engine provided with a shaft, intake and exhaust valves, for each cylinder, and a carburetor for each cylinder the combination of a pair of plates, one plate carrying means to actuate the exhaust valves, the other plate carrying means to actuate the intake valves as well as each carburetor, said shaft passing through said last named plate; and means to shift one plate relative to the other to change the actuation of said intake valves and said carburetors.

28. In an internal combustion engine provided with a shaft, intake and exhaust valves for each cylinder, and a carburetor for each cylinder the combination of a pair of plates, one plate carrying means to actuate the exhaust valves as well as each carburetor, said shaft passing relative to the other to change the actuation of said intake valves and said carburetors, said shaft passing through the shiftable plate at all positions of the latter.

In testimony whereof I affix my signature.

HERMAN A. FINKE.